United States Patent
Boivie et al.

(10) Patent No.: US 10,387,686 B2
(45) Date of Patent: Aug. 20, 2019

(54) HARDWARE BASED ISOLATION FOR SECURE EXECUTION OF VIRTUAL MACHINES

(71) Applicant: INTERNATIONAL BUSINESS MACHINES CORPORATION, Armonk, NY (US)

(72) Inventors: Richard H. Boivie, Monroe, CT (US); Bradly G. Frey, Austin, TX (US); William E. Hall, Clinton, CT (US); Benjamin Herrenschmidt, Narrabundah (AU); Guerney D. H. Hunt, Yorktown Heights, NY (US); Jentje Leenstra, Bondorf (DE); Paul Mackerras, Weston (AU); Cathy May, Ossining, NY (US); Albert J. Van Norstrand, Jr., Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 189 days.

(21) Appl. No.: 15/661,048

(22) Filed: Jul. 27, 2017

(65) Prior Publication Data

US 2019/0034666 A1   Jan. 31, 2019

(51) Int. Cl.
*G06F 9/46* (2006.01)
*G06F 21/74* (2013.01)
(Continued)

(52) U.S. Cl.
CPC .......... *G06F 21/74* (2013.01); *G06F 9/45558* (2013.01); *G06F 21/53* (2013.01);
(Continued)

(58) Field of Classification Search
CPC ...... G06F 21/74; G06F 9/45558; G06F 21/53; G06F 2009/45587; G06F 2221/2149
See application file for complete search history.

(56) References Cited

U.S. PATENT DOCUMENTS 8,578,175 B2   11/2013   Boivie et al.
8,819,446 B2   8/2014   Boivie
(Continued)

FOREIGN PATENT DOCUMENTS

WO   2016048478 A1   3/2016
WO   2016176126 A1   11/2016
(Continued)

OTHER PUBLICATIONS

Jin et al., "Secure MMU: Architectual Support for Memory Isolation among Virtual Machines", Appears in the 7th Workshop on Hot Topics in System Dependability (HotDep '11), IEEE 2011, pp. 217-222.
(Continued)

*Primary Examiner* — Camquy Truong
(74) *Attorney, Agent, or Firm* — Michael O'Keefe

(57) ABSTRACT

Hardware based isolation for secure execution of virtual machines (VMs). At least one virtual machine is executed via operation of a hypervisor and an ultravisor. A first memory component is configured for access by the hypervisor and the ultravisor, and a second memory component is configured for access by the ultravisor and not by the hypervisor. A first mode of operation is operated, such that the virtual machine is executed using the hypervisor, wherein the first memory component is accessible to the virtual machine and the second memory component is not accessible to the virtual machine. A second mode of operation is operated, such that the virtual machine is executed using the ultravisor, wherein the first memory component and the second memory component are accessible to the virtual machine, thereby executing application code and operating system code using the second memory component without code changes.

24 Claims, 9 Drawing Sheets

(51) Int. Cl.
*G06F 9/455* (2018.01)
*G06F 21/53* (2013.01)

(52) U.S. Cl.
CPC .............. *G06F 2009/45587* (2013.01); *G06F 2221/2149* (2013.01)

(56) References Cited

U.S. PATENT DOCUMENTS

| | | | |
|---|---|---|---|
| 8,850,557 | B2 | 9/2014 | Boivie et al. |
| 8,954,752 | B2 | 2/2015 | Boivie et al. |
| 9,323,921 | B2 | 4/2016 | Hunt et al. |
| 2007/0028244 | A1* | 2/2007 | Landis .................. G06F 9/5016 718/108 |
| 2010/0332850 | A1 | 12/2010 | Boivie |
| 2013/0061058 | A1 | 3/2013 | Boivie et al. |
| 2015/0089502 | A1 | 3/2015 | Horovitz et al. |
| 2015/0277949 | A1 | 10/2015 | Loh et al. |
| 2016/0171248 | A1 | 6/2016 | Nesher et al. |
| 2016/0171250 | A1 | 6/2016 | Boivie et al. |

FOREIGN PATENT DOCUMENTS

| | | |
|---|---|---|
| WO | 2016209547 A1 | 12/2016 |
| WO | 2017001580 A1 | 1/2017 |
| WO | 2017014887 A1 | 1/2017 |

OTHER PUBLICATIONS

CVE—"CVE-2015-3456, Common Vulnerabilites and Exposures", The Standard for Information Security Vulnerability Names, https://cve.mitre.org/cgi-bin/cvename.cgi?name=cve-2015-3456,printed Jul. 17, 2017, pp. 1-4.

Hetzelt et al., "Security Analysis of Encrypted Virtual Machines", arXiv: 1612.01119v1 [cs.CR]. Dec. 4, 2016, pp. 1-13.

Tucker, http://www.defenseone.com/technology/2015/07/how-break-cias-cloud-...., "How to Break Into the CIA's Cloud on Amazon—Defense One", printed Jun. 23, 2017, pp. 1-2.

IBM, "Power ISA, Version 3.0 B", Mar. 29, 2017, pp. 1-1258.

ARM Security Technology, "Building a Secure System using TrustZone Technology", Copyright © 2005-2009 ARM Limited, PRD29-GENC-009492C, pp. 1-108.

Mell et al., "The NIST Definition of Cloud Computing", National Institute of Standards and Technology, Special Publication 800-145, Sep. 2011, pp. 1-7.

* cited by examiner

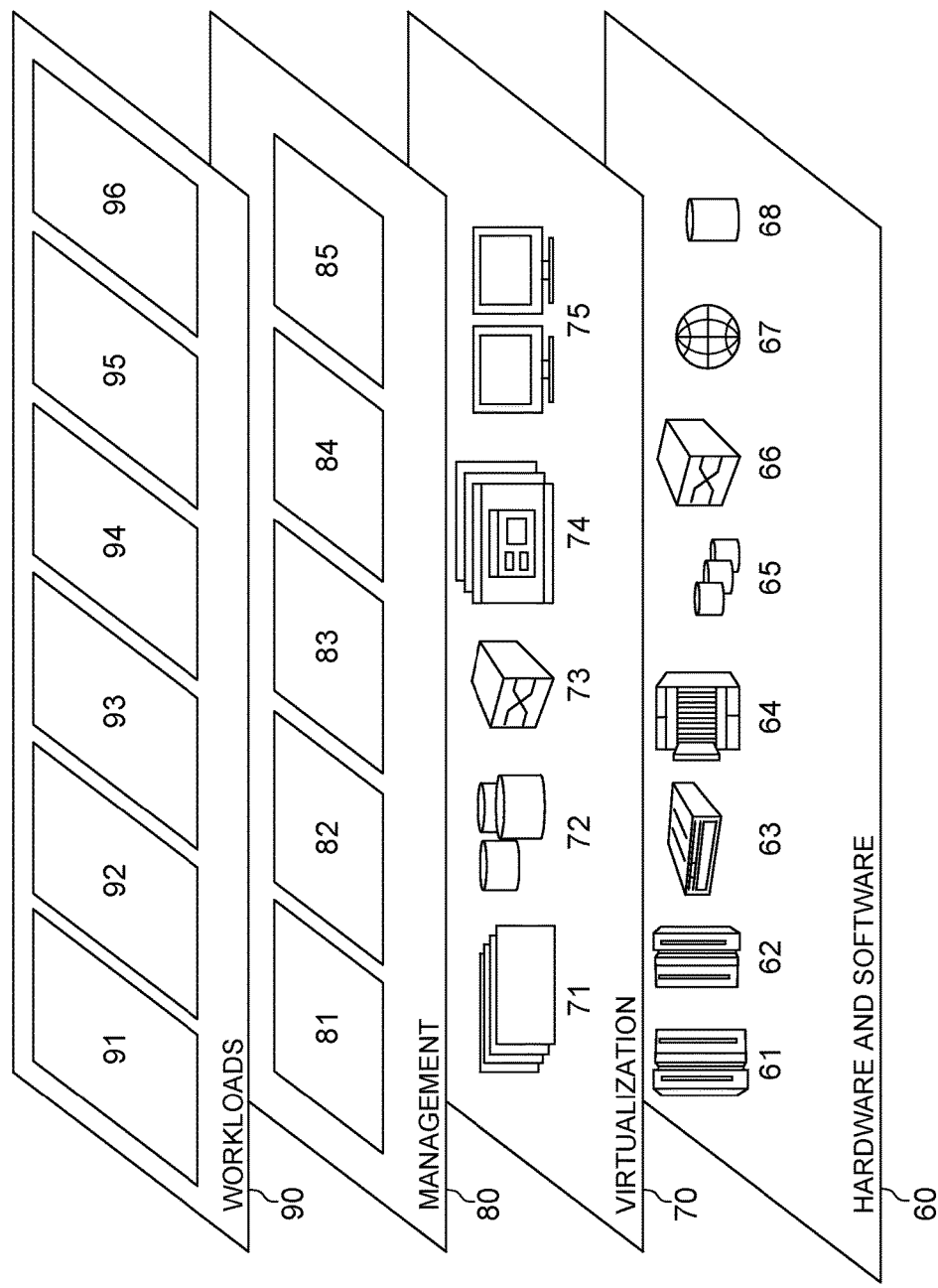

US 10,387,686 B2

HARDWARE BASED ISOLATION FOR SECURE EXECUTION OF VIRTUAL MACHINES

This invention was made with government support under Contract No. BAA 11-02 awarded by Department of Homeland Security, Science and Technology Directorate, Cyber Security Division; and under Contract No. FA8750-12-2-043 awarded by Air Force Research Laboratory Information Directorate. The government has certain rights to this invention.

FIELD OF THE INVENTION

The present invention relates generally to the field of Virtual Machines (VMs), and more particularly improving security of Virtual Machines (VMs) running under control of a hypervisor.

SUMMARY

Embodiments of the present invention provide systems, methods, and computer program products for hardware based isolation for secure execution of virtual machines (VMs). At least one virtual machine is executed via operation of a hypervisor and an ultravisor. A first memory component of one or more computer readable storage media is configured for access by the hypervisor and the ultravisor, and a second memory component of the one or more computer readable storage media is configured for access by the ultravisor and not by the hypervisor. A first mode of operation is operated, such that the virtual machine is executed using the hypervisor, wherein the first memory component is accessible to the virtual machine and the second memory component is not accessible to the virtual machine. A second mode of operation is operated, such that the virtual machine is executed using the ultravisor, wherein the first memory component and the second memory component are accessible to the virtual machine, thereby executing application code and operating system code using the second memory component without code changes.

BRIEF DESCRIPTION OF THE DRAWINGS

FIG. 11 depicts abstraction model layers, in accordance with an embodiment of the present invention.

DETAILED DESCRIPTION

Figure 1:
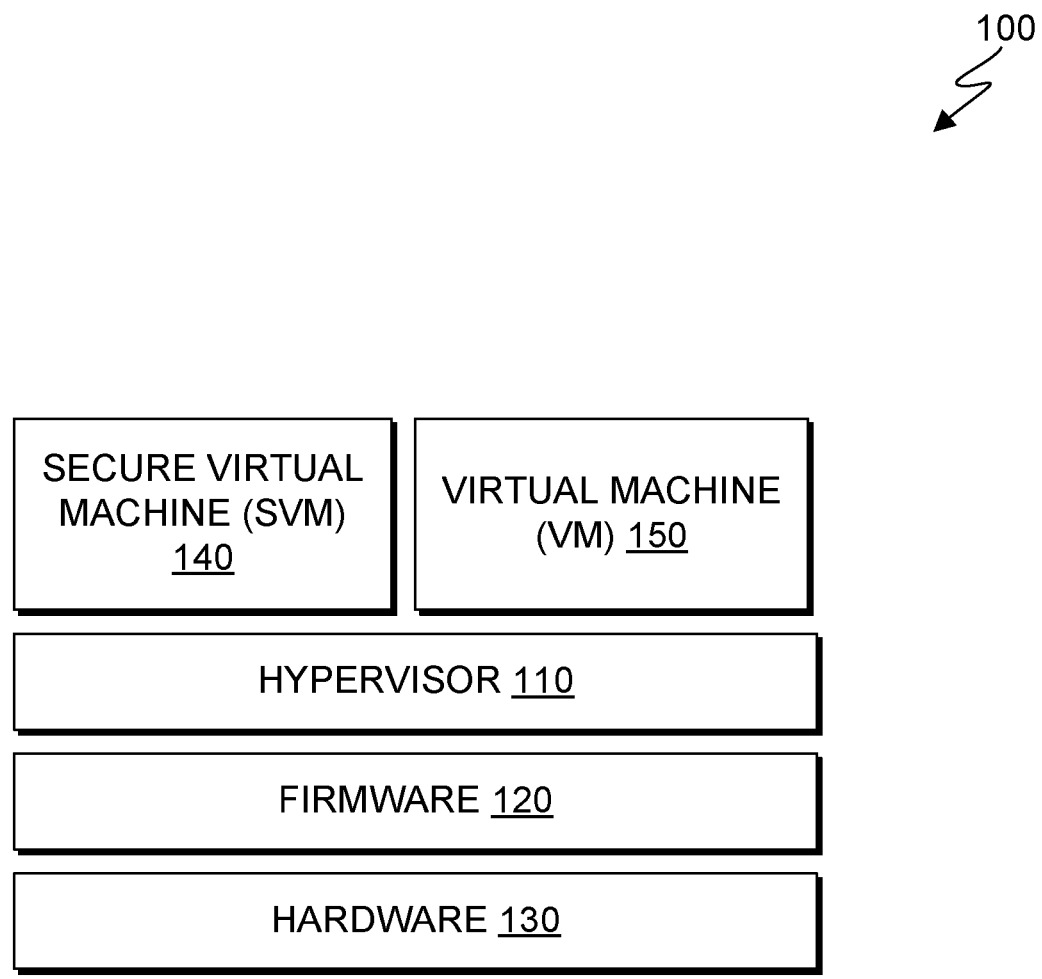
FIG. 1 is a block diagram of a data processing system, in accordance with an embodiment of the present invention.

In cloud computing environments, Cloud Service Providers (CSPs) may manage customer applications using system software to provide services including access to system resources. CSP-managed software typically has complete control over customer application data. An operating system (OS) or a hypervisor may access and/or modify the customer application data. Additionally, security features implemented in a user space of a customer application may be tampered with by an OS or hypervisor without being detected. Typically, CSP-managed software is part of a trusted computing base. Customers may be required to trust that entities, which develop, deploy and control CSP-managed software, are not malicious. Additionally, customers may be required to trust that the CSP-managed software is secure against attacks which may compromise the confidentiality and integrity of the customer applications and the customer application data. Accordingly, customers and the CSP may be required to negotiate service agreements to achieve regulatory compliance, thereby ensuring that security and privacy requirements are met with respect to the customer application data.

Large and disparate teams of software developers may write many lines of software code to develop CSP-managed software including a hypervisor. Members of these teams may be responsible for isolating executables, in addition to Virtual Machines (VMs), from other members in order to protect sensitive information. In some instances, the members themselves may be exposed to potential security vulnerabilities. Accordingly, a Secure Memory Facility (SMF) is implemented to provide protection that is independent of the security of the entire CSP infrastructure. For example, the SMF provides secure isolation of VMs. In this embodiment, the SMF is implemented in hardware of a data processing system as well as a trusted software and firmware component. When this SMF is active, the hardware and firmware components making up the SMF are referred to as an "ultravisor," or alternatively, operating in an ultravisor mode.

In one embodiment, the SMF protects data (e.g., physical pages and other data) in memory (e.g., registers, cache, etc.) associated with secure virtual machines (SVMs) from being accessed by other software applications operating in other SVMs. Additionally, the SMF may protect data in memory associated with SVMs from software applications executed by a hypervisor and other software applications operating in VMs. For example, if a system software accesses a secured physical page, then an SMF may handle access to the secured physical page while protecting the secured physical page's integrity and confidentiality, regardless of whether a corresponding SVM is executing or resting. In this example, even a privileged attacker, such as a malicious or compromised hypervisor, may not access an SVM's memory pages, and thus not modify and/or tamper with customer application data or software code without detection.

In another embodiment, an SMF ensures that no unintended state of an SVM leaks to a hypervisor which attempts to access the SVM's secure memory, by preventing, or restricting, the hypervisor from accessing the SVM's secure memory. Furthermore, an SMF-enabled hardware may handle ultravisor and hypervisor interrupts, such that the ultravisor may securely save the SVM's registers into secure memory and clear the SVM's register content. Additionally, all secure data, including customer application data stored in secure memory, is still protected from access by the hypervisor upon a context switch. The ultravisor may encrypt a secure memory page and store the secure memory page in an encrypted format in memory, accessible by the hypervisor in instances where the hypervisor performs tasks, such as paging to disk storage. To return to the SVM after a context switch, a hypervisor may call the ultravisor explicitly, via a "ucall" or in another embodiment the SMF hardware may force the entrance of the ultravisor state, thereby enabling the ultravisor to securely restore the SVM's registers before returning to SVM execution.

Embodiments of the present invention provide methods, systems, and computer program products adding a secure bit in a Machine State Register (MSR) to enable a Secure Virtual Machine (SVM) and an ultravisor mode of operation. Additionally, embodiments of the present invention implement hardware mechanisms for preventing or restricting access to secure memory by a hypervisor and VMs. Furthermore, embodiments of the present invention include hardware additions for enabling the ultravisor to save and restore a state of SVMs before the hypervisor is called to control various tasks, such as paging to disk storage.

The descriptions of the various embodiments of the present invention have been presented for the purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FIG. 1 is a block diagram of data processing system 100, in accordance with an embodiment of the present invention. Data processing system 100 includes hypervisor 110, firmware 120, hardware 130, SVM 140, and VM 150. In one embodiment, components of data processing system 100 may be interconnected via a network (not depicted) for example, a local area network (LAN), a wide area network (WAN) such as the Internet, or a combination of the two, and include wired, wireless, or fiber optic connections. Data processing system 100 may be a desktop computer, laptop computer, specialized computer server, or any other computer system known in the art. In certain embodiments, data processing system 100 may represent computer systems utilizing clustered computers and components to act as a single pool of seamless resources when accessed through a network. For example, such embodiments may be used in data center, cloud computing, storage area network (SAN), wide area network (WAN), and network attached storage (NAS) applications. In general, the computing systems described herein are representative of any electronic device, or combination of electronic devices, capable of executing machine-readable program instructions, in accordance with an embodiment of the present invention, as described in greater detail with regard to FIG. 9. In this embodiment, data processing system 100 is implemented in various cloud computing environments, as described in greater detail with regard to FIGS. 10 and 11. In one embodiment, data processing system 100 includes a data processing unit configured to process data in either a single threaded or multi-threaded mode. Furthermore, the data processing unit is further operated to execute instruction architecture extensions, as described in greater detail below.

Hypervisor 110 represents a system software, such as a virtual machine monitor (VMM) configured to manage, create, and execute SVM 140 and VM 150. Hypervisor 110 is an untrusted system software component. Furthermore, hypervisor 110 is part of one security domain, along with VM 150 (i.e., virtual machines that are not protected by SMF security capabilities).

Firmware 120 represents a trusted system software component configured to provide control, monitor and manipulate data executed by trusted hardware 130. In this embodiment, firmware 120 manages a second security domain, referred to as a secure memory domain. Furthermore, each SVM 140 is assigned to the secure memory domain. Firmware 120 operates in an ultravisor mode, which is a privilege level above hypervisor 110 mode. In the ultravisor mode, firmware 120 is configured to control the regular partition scoped address translation mechanism, along with hardware 130 for maintain separation between the two security domains. Additionally, firmware 120 is configured to maintain separation of each SVM 140 within the secure memory domain.

Hardware 130 mechanisms may be used to invoke firmware 120 whenever a transition between the two security domains occurs, thus enabling firmware 120 to assure that the state of a process in one security domain is properly isolated from the state of a process in the other security domain.

Subsystems of data processing system 100 (not depicted) may interact with data processing system 100 memory independently of hardware 130 components, such as a processor. These subsystems may be modified such that all untrusted devices (e.g., Input/Output (I/O) devices) cannot access the secure memory domain. Subsystem data which is secure may be encrypted in the non-secure memory domain. Furthermore, firmware 120 operating in an ultravisor state, ultravisor mode, may read the encrypted data and decrypt the data, at the storage operation, into the secure memory domain. Similarly, secure data in the secure memory domain may be encrypted and may have a secure hash added before being stored in hypervisor 110/VM 150 memory domain. The encrypted data can thereafter be paged out by hypervisor 110 to disk storage. Accordingly, data and state information related to SVM 140 will not be in a clear text format outside the secure memory domain and is integrity protected by the secure hash.

Hardware 130 represents hardware components for data processing system 100. In this embodiment, an SMF-enabled processor is included in hardware 130 and has a set of asymmetric keys and may have associated symmetric keys that are used for protecting the secure data handled by SVM 140.

SVM 140 is similar to VM 150, but is packaged for SMF with secure data which is encrypted with a public SMF key of a target processor. A private SMF key may be protected by a Trusted Platform Module (TPM) and becomes available only when the correct firmware 120 is loaded during boot. In this embodiment, a trusted entity that manufactures and distributes the SMF-enabled processors issues certificates for their public keys.

Figure 2:
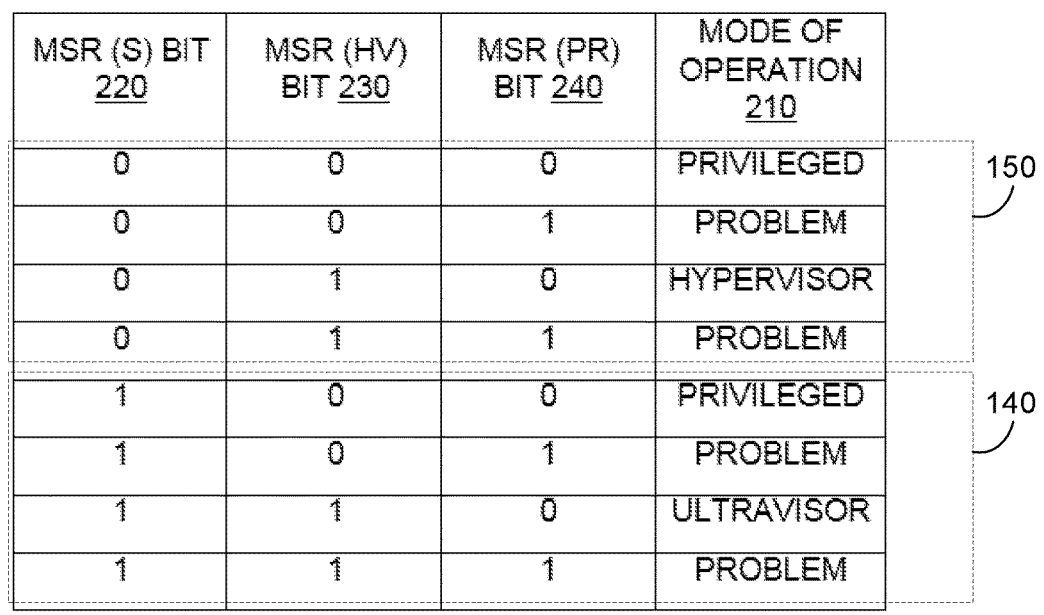
FIG. 2 is a table of machine states, in accordance with an embodiment of the present invention.

FIG. 2 is a table of machine states, in accordance with an embodiment of the present invention. In this embodiment, a typical mode of operation 210 is extended with a second mode by MSR (S) bit 220, which is for example, a security bit. A typical first mode of operation 210 (e.g., privileged, problem, and hypervisor) for VM 150 and hypervisor 110 is maintained if MSR (S) bit 220 is set to 0. With SMF, another mode of operation 210 (e.g., ultravisor) is active if MSR (S) 220 is set to 1. MSR (S) bit 220 is set to 1 for SVM 140 and the ultravisor. To enable that in SVM 140 the application and OS code executed in VM 150 may operate unchanged, problem and privileged states are supported with the MSR (S) bit 220 equal to 1. Accordingly, this provides the same behavior as the typical mode of operations 210, but with access (e.g., read/write/modify data) to secure memory. By defining that the ultravisor state will be entered, instead of hypervisor 110 when MSR (S) bit 220 is 1, all system calls and exceptions going the hypervisor state, or hypervisor mode, (by setting the MSR (HV) bit 230, and MSR (PR) bit 240 to 1 and 0, respectively) will in the SVM mode of operation 210 enter the ultravisor state. In this embodiment, hardware 130 maintains the MSR (S) bit 220 unchanged and defines the ultravisor state by setting MSR (S) bit 220, MSR (HV) bit 230, and MSR (PR) bit 240 to 1, 1 and 0, respectively. Accordingly, without any code changes of the code running inside SVM 140, the ultravisor will maintain control, instead of hypervisor 110, when otherwise in VM 150 the hypervisor state would be entered. This enables saving and clearing secure data and state information before the ultravisor gives control over to hypervisor 110. The transition of state from the ultravisor state to the hypervisor state is performed by resetting MSR (S) bit 220 to 0 by the ultravisor return from interrupt double word instruction.

Figure 3:
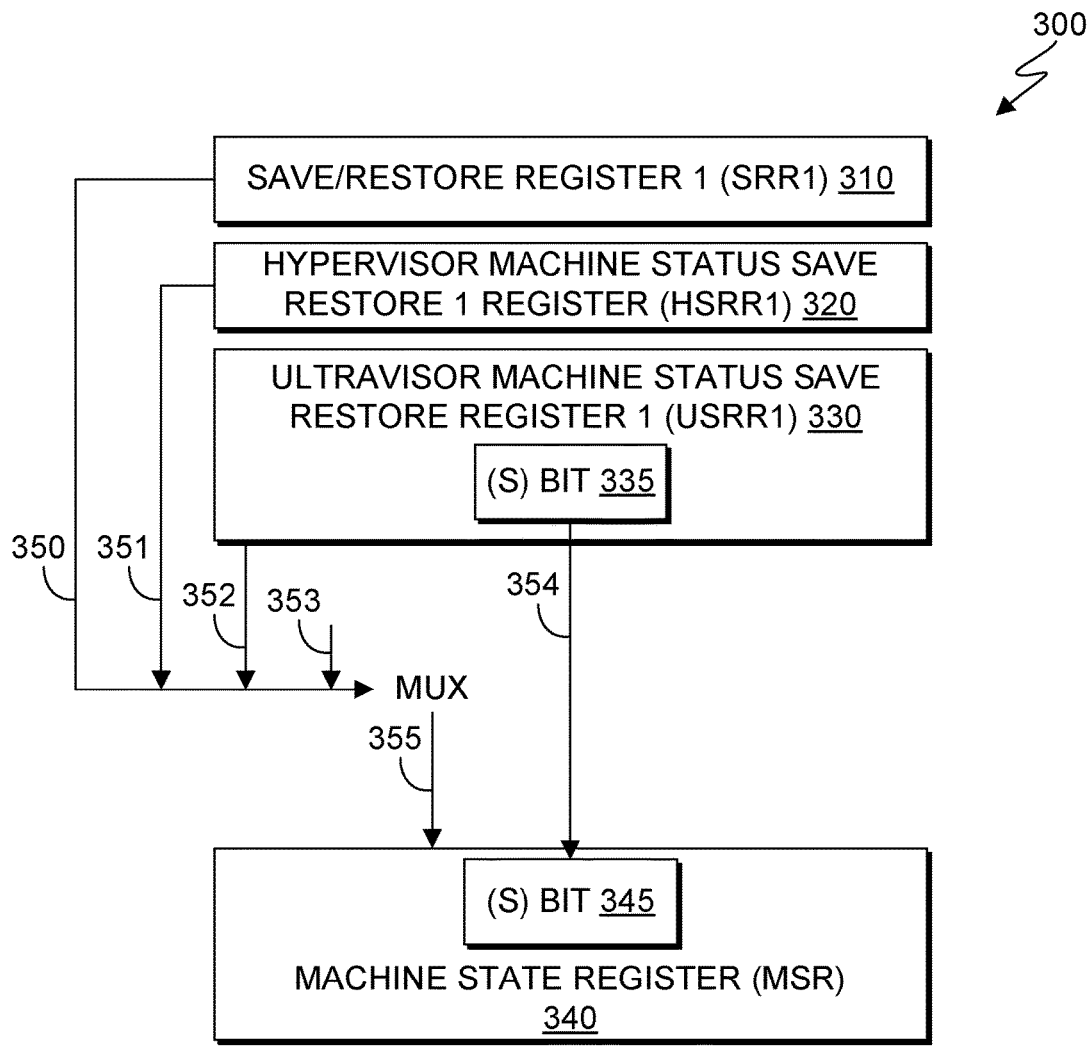
FIG. 3 is a block diagram of using an ultravisor return from interrupt double word (URFID) instruction, in accordance with an embodiment of the present invention.

FIG. 3 is a block diagram of using an ultravisor return from interrupt double word (URFID) instruction, in accordance with an embodiment of the present invention. Bit 41 of MSR 340 is typically reserved (e.g., not used in a POWER® Instruction Set Architecture). In this embodiment, bit 41 is allocated for MSR (S) bit 345. The URFID instruction is associated with the ultravisor Machine Status Save Restore Register 1 (USRR1) 330 and USRR0 (not depicted). The URFID instruction is similar to that of a hypervisor return from interrupt double word (HRFID) instruction, with respect to a hypervisor Machine Status Save Restore Register 1 (HSRR1) 320 and HSRR0 (not depicted). Additionally, the URFID instruction is similar to that of a return from interrupt double word (RFID) instruction with respect to a Status Save Restore Register 1 (SRR1) 310 and SRR0 (not depicted). In this embodiment, the HRFID instruction, HSRR0 and HSRR1 320, are hypervisor 110 privileged facilities; and the URFID instruction, USRR0 and USRR1 330, are ultravisor firmware 120 privileged facilities. Accordingly, the URFID instruction may only be executed in an ultravisor state. Similarly, USRR0 and USRR1 330 and USPRG0 and USPRG1 may only be accessed and modified in an ultravisor state. After execution of an URFID instruction, HRFID instruction and RFID instruction, the address to which control is returned to is provided by USRR0, HSRR0 and SRR0.

In one embodiment, MSR (S) bit 345 may be set by executing an "ucall", which is implemented by a system call with 'parm' set to new level 2. In another embodiment, MSR (S) bit 345 may be set by executing an instruction called 'msgsndu' on a processing thread that is operating in an ultravisor state. Accordingly, by executing an 'msgsndu' instruction in such a manner initiates an ultravisor exception on one or more other processing threads, thereby entering the ultravisor state.

In this embodiment, flow 350 represents a RFID instruction transmitted from SRR1 310. Flow 351 represents an HRFID instruction transmitted from HSRR1 320. Flow 352 represents an URFID instruction transmitted from USRR1 330. Flow 354 represents that URFID instruction transmitting the S bit from (S) bit 335 of USRR1 330 to (S) bit 345 of MSR 340. Furthermore, each of flows 350, 351, 352 and 353 do not include the (S) bit and therefore leave MSR(S) bit 345 unchanged. Flow 353 represents move to machine state register (MTMSR) instructions as well as other types of instructions. Flow 355 represents a write of the MSR register for all bits except the (S) bit which is a result from a mux of flows 350, 351, 352 and 353. In this embodiment, URFID instruction is the only way to reset MSR (S) bit 345. To do so, the USRR1 330 (S) bit 345 is set to 0 in the ultravisor state and next the execution of an URFID instruction in ultravisor state will set the MSR (S) bit 345 to 0, thereby entering the hypervisor state. Accordingly, the ultravisor will be able to save the secure data of SVM 140 in secure memory and to clear the processor registers before moving to the hypervisor state.

Figure 4:
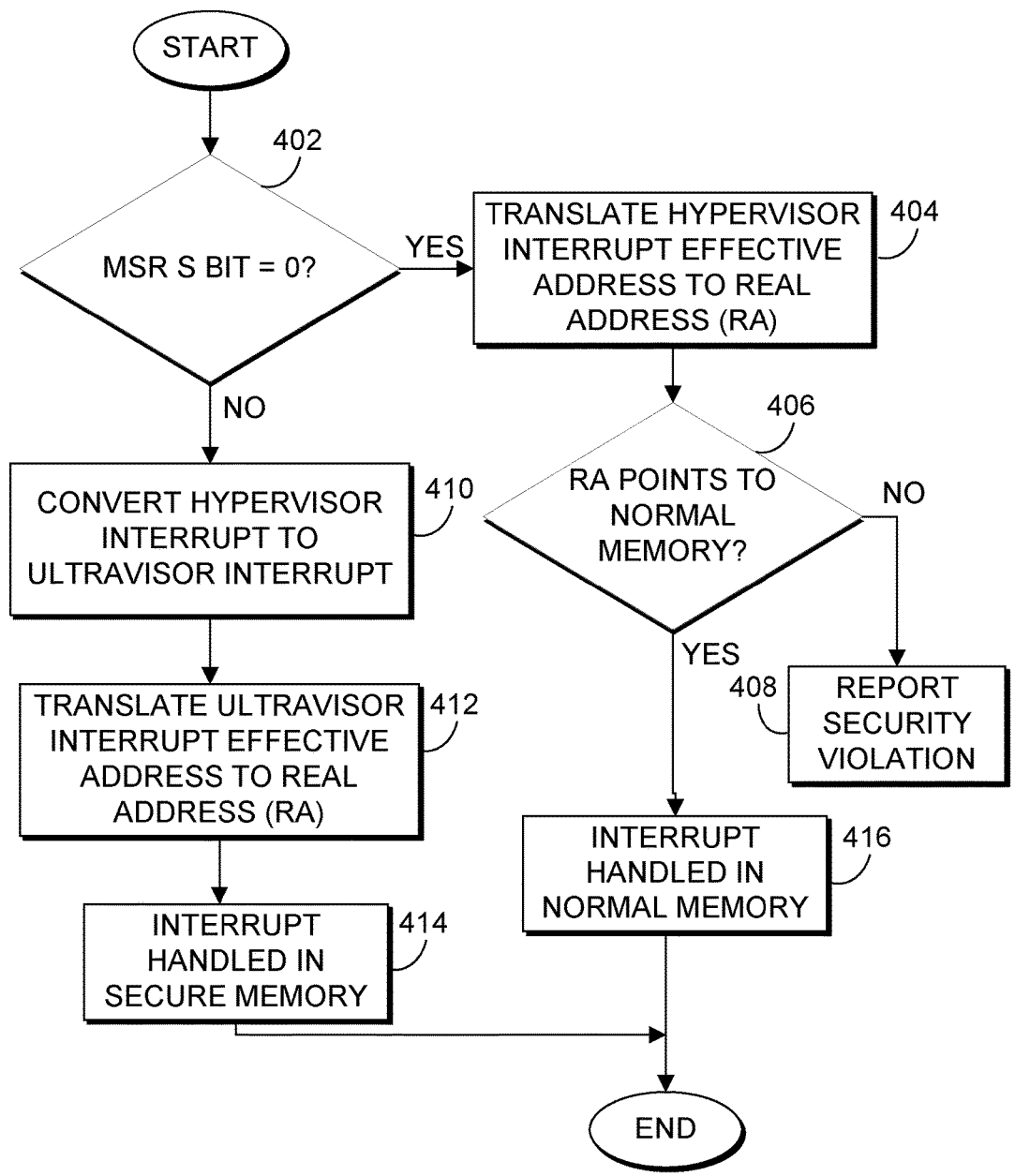
FIG. 4 is a flowchart illustrating operational steps for calculating the interrupt handler start address for interrupt vectors in secure and normal memory, in accordance with an embodiment of the present invention.

FIG. 4 is a flowchart illustrating operational steps for calculating the interrupt handler start address for interrupt vectors in secure and normal memory, in accordance with an embodiment of the present invention. In decision 402, SMF-enabled hardware 130 determines whether a MSR (S) bit is set to 0. If SMF-enabled hardware 130 determines that the MSR (S) bit is set to 0 ('yes' branch, decision 402), then a hypervisor interrupt effective address is translated with the help of a hypervisor real mode offset register (HRMOR) into a real address (step 404). SMF-enabled hardware 130 determines whether that the translation outcome points to normal memory (decision 406). If SMF-enabled hardware 130 determines that the translation outcome does not point to normal memory ('no' branch, decision 406), then a security violation is identified and reported, and execution of the interrupt is not allowed. If SMF-enabled hardware 130 determines that the translation outcome points to normal memory ('yes' branch, decision 406), then the resulting interrupt vector will point to the hypervisor interrupt handler entry real address in normal memory and execution for the interrupt handling will proceed (step 416). In one embodiment, hypervisor interrupts to the ultravisor are intercepted.

If SMF-enabled hardware 130 determines that the MSR (S) bit is not set to 0 ('no' branch, decision 402), then the hypervisor interrupt is converted into an ultravisor interrupt (step 410). Then, the ultravisor interrupt effective address is translated with the help of an ultravisor real mode offset register (URMOR) into a real address (step 412). The ultravisor interrupt real address will point to the ultravisor interrupt handler entry point in secure memory. Accordingly, execution for the interrupt handling proceeds in secure memory (step 414).

In order for the ultravisor interrupt to translate into a different real address, which is in secure memory, a new ultravisor privileged ultravisor real mode offset register (URMOR) is implemented. For an SMF-enabled processor, MSR (S) bit 345 setting will determine if the HRMOR or URMOR will be used for the effective address to real mode address translation. In this manner, VM 150 and hypervisor 110 will behave unchanged and have their interrupt vector real address in normal memory. The use of the URMOR real mode translation mode ensures that for SVM 140 the interrupt vector is in secure memory, such that the ultravisor interrupt handler may not be modified by hypervisor 110. Accordingly, the ultravisor may perform all exception handling for which secure data is involved. Once the SVM data is saved and the registers are cleared the ultravisor may, by using URFID to set the MSR(S) bit to 0, ask hypervisor 110 to perform the rest of the exception handing to keep the ultravisor code small.

Figure 5:
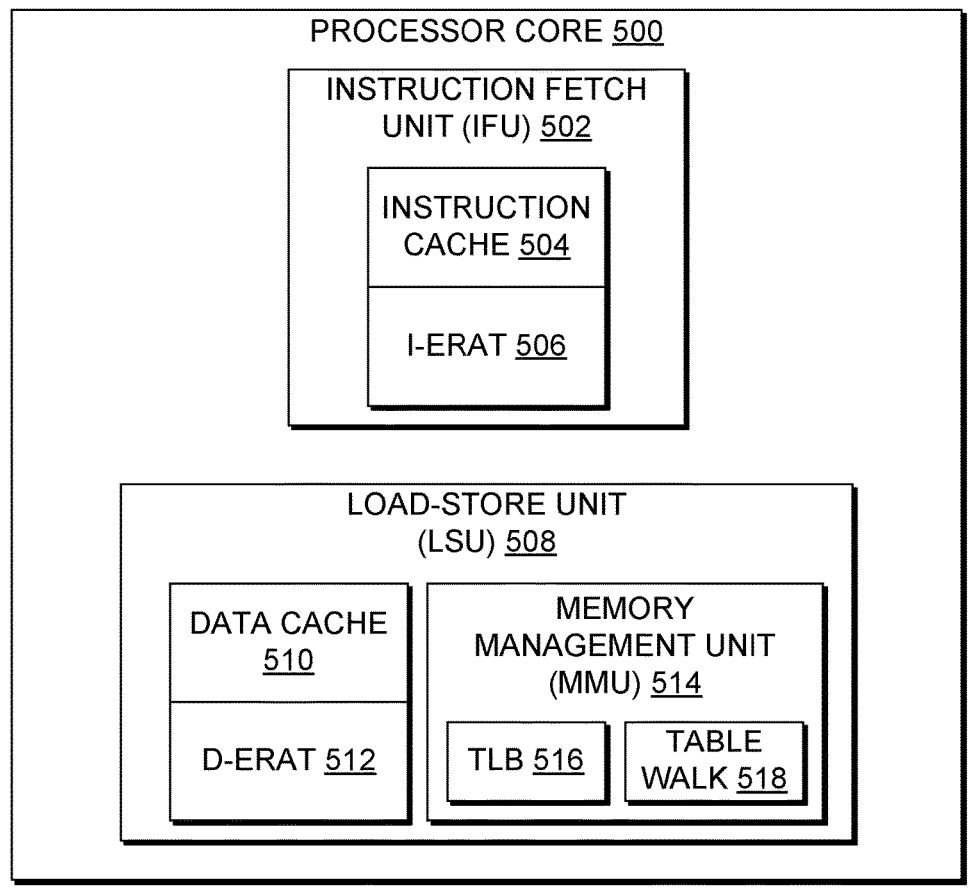
FIG. 5 is a block diagram of hardware additions to a processor of the data processing system, in accordance with an embodiment of the present invention.

FIG. 5 is a block diagram of hardware 130 additions to a processor of data processing system 100, in accordance with an embodiment of the present invention. In this embodiment, by adding the S bit information it is known to the address translation if a thread is running in the traditional mode of operation (e.g., MSR (S) bit is 0) or in the secure mode of operation (e.g., MSR (S) is 1). Furthermore, by adding the S bit to effective to real address translation (ERAT), D-ERAT 512 and instruction ERAT (I-ERAT) 506, a "hit" will only occur if the MSR (S) bit matches. Similarly, translation lookaside buffers (TLBs) 516 may be extended with an S bit to ensure that only entries in which the S bit matches the MSR (S) bit of the thread performing the access will "hit" and will be used.

If an effective address has no "hit" in I-ERAT 506, D-ERAT 512 and TLB 516, then table walk 518 will be started. If table walk 518 is started for a load/store effective address with the MSR (S) bit is 0, the generated real address may not point to secure memory. If the real address points to secure memory at the end of the address translation, then SMF-enabled hardware 130 will detect such an instance and no data will be loaded/stored. In such an instance, a storage exception may be reported using the existing Data Storage Interrupt (DSI), Hypervisor Data Storage Interrupts (HDSI), Instruction Storage Interrupt (ISI) or Hypervisor Instruction Storage Interrupts (HISI). The security access violation may be indicated by a bit in the (H)SRR1 for a (H)ISI and DSISR/HDSISR for DSI/HDSI.

Figure 6:
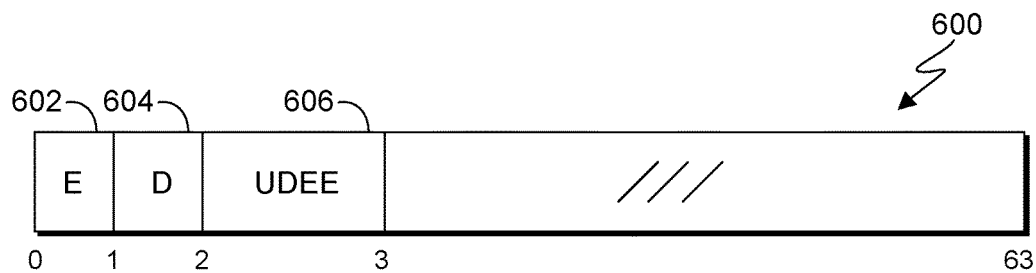
FIG. 6 is a block diagram of a secure memory control register (SMFCTRL), in accordance with an embodiment of the present invention.

FIG. 6 is a block diagram of a secure memory control register (SMFCTRL) 600, in accordance with an embodiment of the present invention. SMFCTRL 600 contains enable (E) bit 602 to enable SMF secure memory access checking at the end of the address translation. Furthermore, a debug (D) bit 604 is added. The trace facilities for the debug mode as provided by the CIABR, DAWRn and DAWRXn registers without SMF will only support the address and data tracing in a problem, a privileged and a hypervisor state. Therefore, SMFCTRL 600 adds D bit 604, providing the ability to support address and data tracing in ultravisor mode.

Furthermore, if the D bit 604 is set to 1, the CIABR, DAWRn and DAWRXn become ultravisor privileged facilities such that a thread in a problem, a privileged and a hypervisor state cannot access these registers. Finally, UDEE bit 606 enables an msgsndu ultravisor doorbell interrupt to exit from a power saving state.

Figure 7:
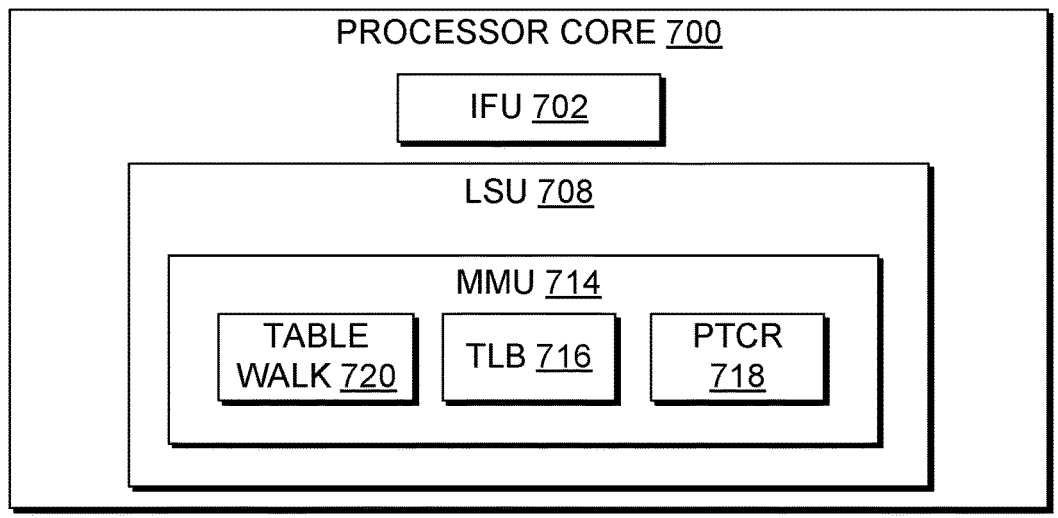
FIG. 7 is a block diagram of isolations of the SVMs, in accordance with an embodiment of the present invention.

FIG. 7 is a block diagram of isolations of SVM 140 in processor core 700, in accordance with an embodiment of the present invention. In this embodiment, isolations of SVM 140 is maintained by letting the ultravisor manage the partition scoped page table in secure memory. In general, security of real memory is specified by means of an address range, a bit array indexed by real page number, etc. For example, the secure memory property versus normal memory property may be defined in the form of a bit of the real address bit that indicates if the page is secure or normal memory based on that real address bit being set or not. In another embodiment the distinction that the memory page or cache line is being part of secure or normal memory may be part of a separate data structure with each memory page or cache line having an associated bit in a bit array, where the bit array is fetched as part of the table walk.

SVM 140 manages its own process scoped page tables. The partition scoped page table, as well as the process scoped page table, for SVM 140 is in secure memory. In contrast, the partition scoped page table, as well as the process scoped page table, for VM 150 is in normal memory. The process scoped page table of SVM 140 is managed by the ultravisor. In one embodiment, table walk 720 hardware enables access to the pointer in the partition table to the partition scoped table in secure memory. Furthermore, table walk 720 may read a software structure starting with a PTCR pointer to map the effective address to the real address. Accordingly, the S bit is checked to be set to 0, such that it ensures that the pointer to the process scoped page table points to normal memory. In another embodiment the hypervisor will do an ucall to ask the ultravisor to provide the pointer to the process scoped table. Furthermore, during the process scoped page table walk at every level of a radix tree the S bit will be verified to be zero in the entry as a hypervisor could change the process scoped page table entry to point into secure memory. If an S bit mismatch is found, a security access exception will be reported, as previously described with respect to FIG. 5.

Figure 8:
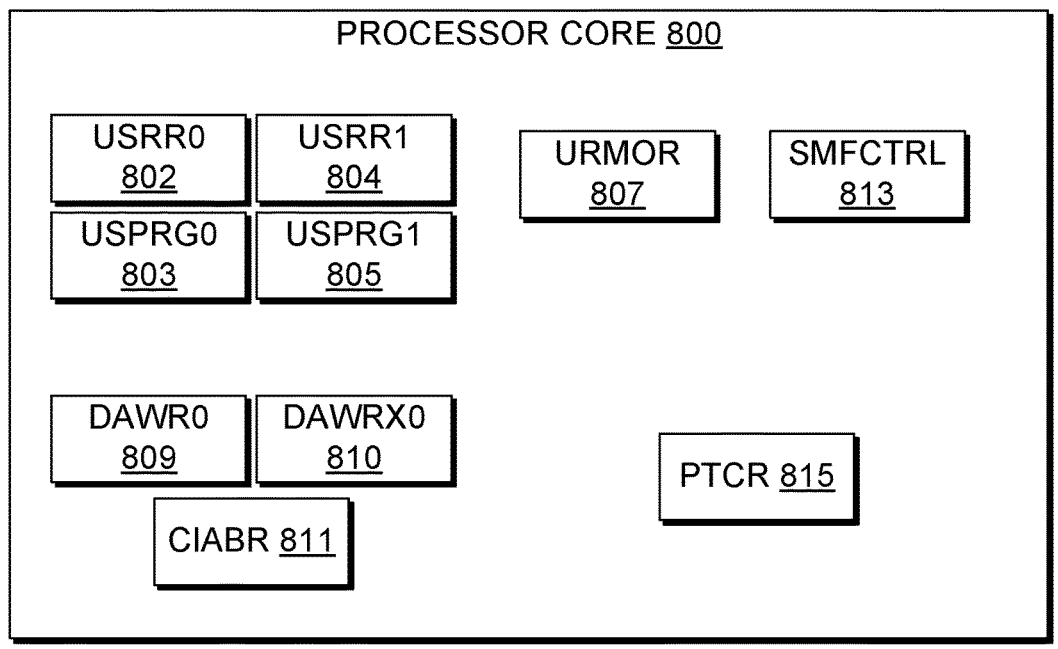
FIG. 8 is a block diagram of ultravisor privileged registers, in accordance with an embodiment of the present invention.

FIG. 8 is a block diagram of ultravisor privileged registers within processing core 800, in accordance with an embodiment of the present invention. In this embodiment, the ultravisor implements new, ultravisor-privileged instructions and registers added by SMF and the dependence on the SMFCTRL 813 E and D bit setting. Additionally, an ucall is implemented introducing a system call with expanding the level field (LEV) value to 2. The LEV field in the system call instruction LEV=0 (SRR1(43)=0 for the System Call interrupt) is a syscall, LEV=1 (SRR1(43)=1) is a hcall. For the ucall implementation the LEV field is expanded to two bits, and the System call interrupt reports the ucall by using the previously unused SRR1(42). LEV=2 is defined as an ucall (SRR1(42,43)=10) if SMFCTRL 813 E is set to 1; otherwise SMF-enabled hardware 130 converts it into an hcall (SRR1 (42,43)=01) to allow SMF disabled systems to run without ultravisor firmware 120. Next to the ucall the ultravisor privileged URFID, msgsndu and msgclru are added to the Instruction Set Architecture (ISA) for an SMF. They are defined in the same way as the existing hypervisor privileged HRFID, msgsnd and msgclr, as discussed earlier with regard to URFID and msgsndu. Furthermore, the tracing facilities DAWR0 809, DAWRX0 810 and CIABR 811 require special handling, as previously described. In this embodiment, PTCR 815 is ultravisor privileged when SMFCTRL 813 E is set to 1, because PTCR 815 points to where the partition table is located in secure memory. In this way, the pointer value stored by the PTCR 815 to the partition table is protected from hypervisor 110. The hypervisor cannot change the PTCR 815 pointer to a location in normal memory, because PTCR 815 is ultravisor privileged. Therefore, when the SMFCTRL 813 enable bit is turned on, a mtspr writing PTCR 815 register may be performed only in an ultravisor state.

Figure 9:
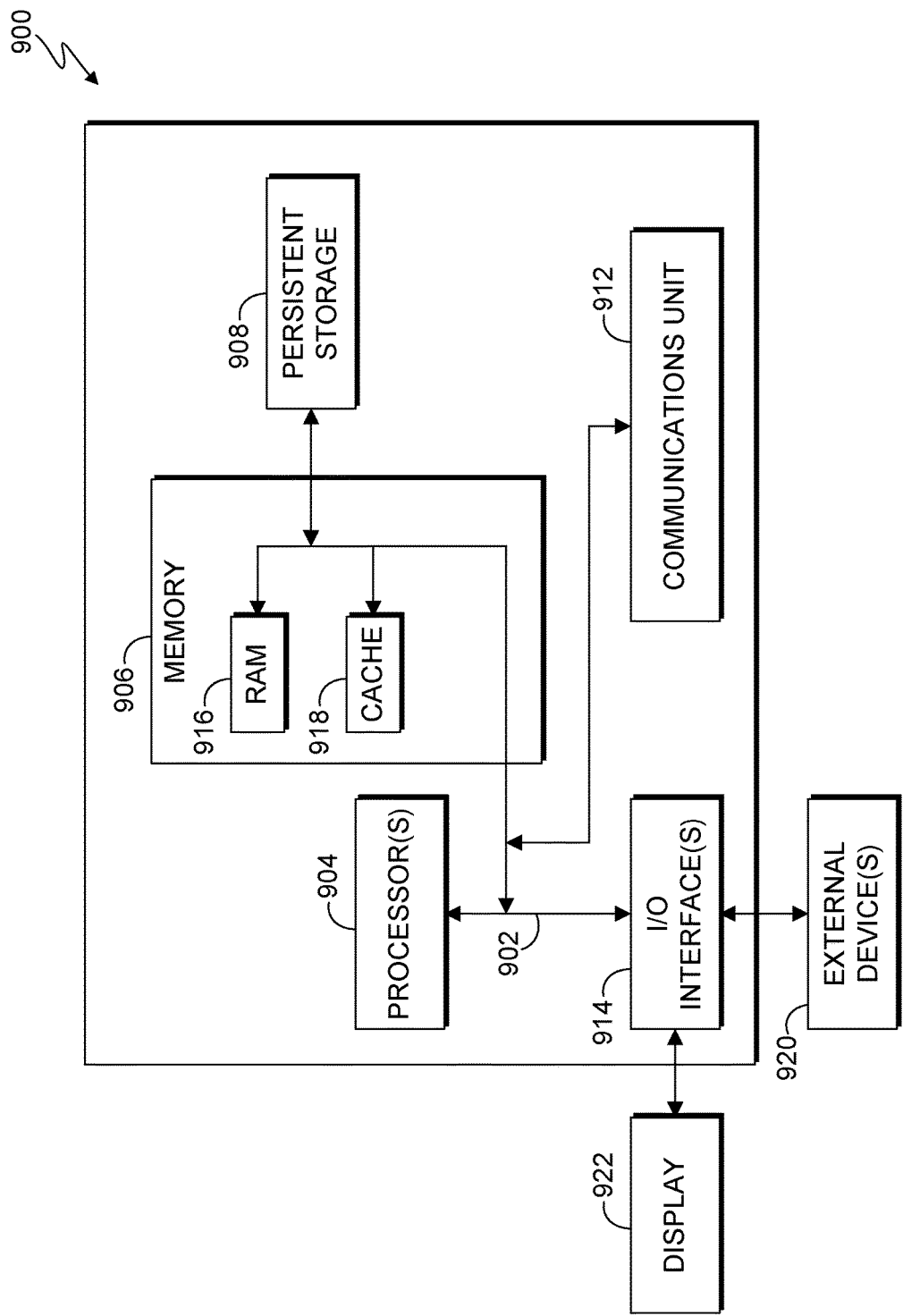
FIG. 9 is a block diagram of internal and external components of the computer system of FIG. 1, in accordance with an embodiment of the present invention.

FIG. 9 is a block diagram of internal and external components of a computer system 900, which is representative the computer systems of FIG. 1, in accordance with an embodiment of the present invention. It should be appreciated that FIG. 9 provides only an illustration of one implementation and does not imply any limitations with regard to the environments in which different embodiments may be implemented. In general, the components illustrated in FIG. 9 are representative of any electronic device capable of executing machine-readable program instructions. Examples of computer systems, environments, and/or configurations that may be represented by the components illustrated in FIG. 9 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cognitive computing environments that include any of the above systems or devices.

Computer system 900 includes communications fabric 902, which provides for communications between one or more processors 904, memory 906, persistent storage 908, communications unit 912, and one or more input/output (I/O) interfaces 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media. Software is stored in persistent storage 908 for execution and/or access by one or more of the respective processors 904 via one or more memories of memory 906.

Persistent storage 908 may include, for example, a plurality of magnetic hard disk drives. Alternatively, or in addition to magnetic hard disk drives, persistent storage 908 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 908 can also be removable. For example, a removable hard drive can be used for persistent storage 908. Other examples include optical and magnetic disks, thumb drives, and smart cards that are inserted into a drive for transfer onto another computer-readable storage medium that is also part of persistent storage 908.

Communications unit 912 provides for communications with other computer systems or devices via a network. In this exemplary embodiment, communications unit 912 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 912 (e.g., via the Internet, a local area network or other wide area network). From communications unit 912, the software and data can be loaded onto persistent storage 908.

One or more I/O interfaces 914 allow for input and output of data with other devices that may be connected to computer system 900. For example, I/O interface 914 can provide a connection to one or more external devices 920, such as a keyboard, computer mouse, touch screen, virtual keyboard, touch pad, pointing device, or other human interface devices. External devices 920 can also include portable computer-readable storage media such as, for example, thumb drives, portable optical or magnetic disks, and memory cards. I/O interface 914 also connects to display 922.

Display 922 provides a mechanism to display data to a user and can be, for example, a computer monitor. Display 922 can also be an incorporated display and may function as a touch screen, such as a built-in display of a tablet computer.

Figure 10:
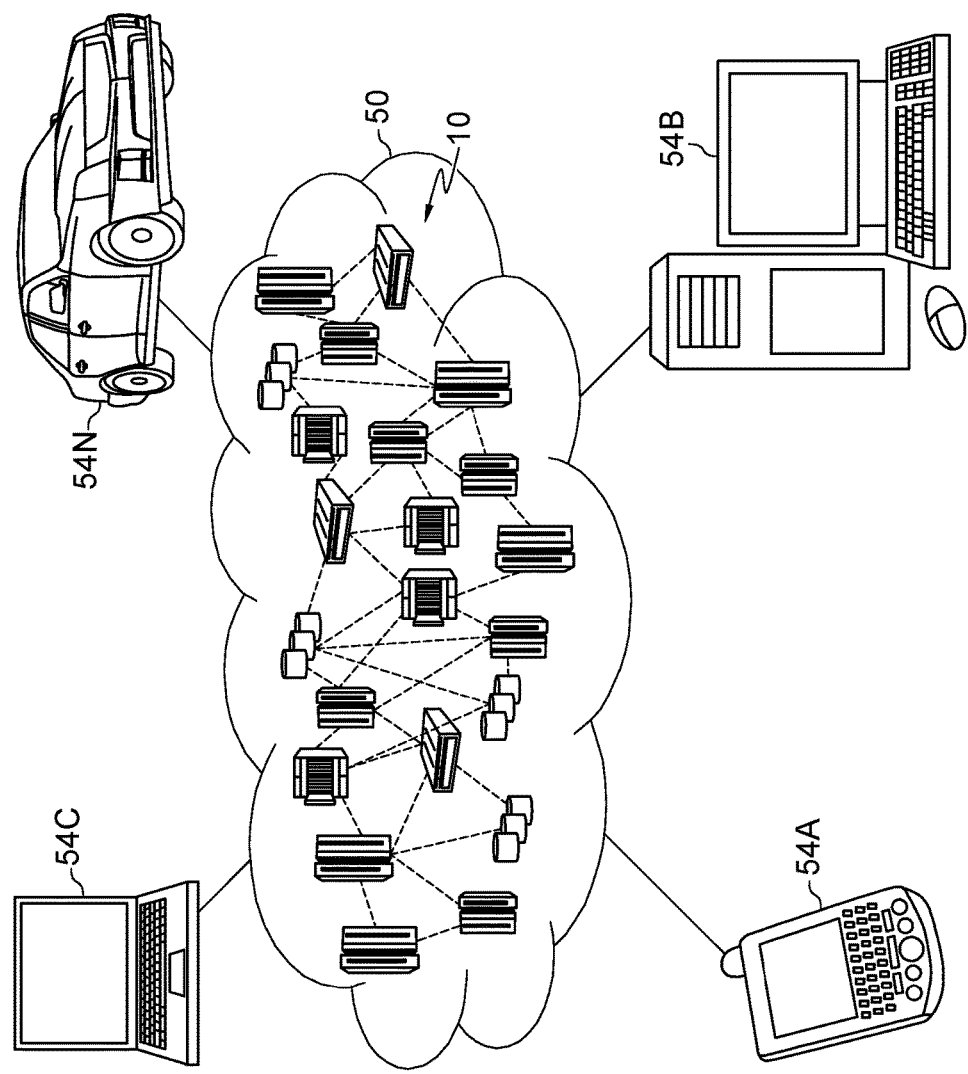
FIG. 10 depicts a cloud computing environment, in accordance with an embodiment of the present invention.

Referring now to FIG. 10, illustrative cognitive computing environment 50 is depicted. As shown, cognitive computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cognitive computing environment 50 to offer infrastructure, platforms and/or software as services for which a cloud consumer does not need to maintain resources on a local computing device. The types of computing devices 54A-N shown in FIG. 10 are intended to be illustrative only and that cloud computing nodes 10 and cognitive computing environment 50 can communicate with any type of computerized device over any type of network and/or network addressable connection (e.g., using a web browser).

Referring now to FIG. 11, a set of functional abstraction layers provided by cognitive computing environment 50 (FIG. 10) is shown. The components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cognitive computing environment. Metering and Pricing 82 provide cost tracking as resources are utilized within the cognitive computing environment, and billing or invoicing for consumption of these resources. In one example, these resources may comprise application software licenses. Security provides identity verification for cloud consumers and tasks, as well as protection for data and other resources. User portal 83 provides access to the cognitive computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cognitive computing environment may be utilized. Examples of workloads and functions which may be provided from this layer include: mapping and navigation 91; software development and lifecycle management 92; virtual classroom education delivery 93; data analytics processing 94; transaction processing 95; and appetite improvement system 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cognitive computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system comprising:
   a data processing unit configured to execute at least one virtual machine via operation of a hypervisor and an ultravisor;
   one or more computer readable storage media, wherein a first memory component of the one or more computer readable storage media is configured for access by the hypervisor and the ultravisor, and wherein a second memory component of the one or more computer readable storage media is configured for access by the ultravisor and not by the hypervisor;
   the data processing unit further operated in a first mode of operation that executes the virtual machine using the hypervisor, wherein the first memory component is accessible to the virtual machine and the second memory component is not accessible to the virtual machine; and
   the data processing unit further operated in a second mode of operation that executes the virtual machine using the ultravisor, wherein the first memory component and the second memory component are accessible to the virtual machine, thereby executing application code and operating system code using the second memory component without code changes.

2. The computer system of claim 1, wherein:
the data processing unit is further operated to execute instruction architecture extensions to add a secure bit to a thread machine state register of the data processing unit, wherein the secure bit is set to a first value to indicate to the data processing unit to operate in the first mode of operation, and wherein the secure bit is set to a second value to indicate to the data processing unit to operate in the second mode of operation;
when the data processing unit operates in the first mode of operation, data written to the one or more computer readable storage media is written to the first memory component;
when the data processing unit operates in the second mode of operation, the one or more computer readable storage media is configured to access data to the first memory component and the second memory component;
when the data processing unit changes from the second mode of operation to the first mode of operation, before operating in the first mode of operation, the data in the second memory component requested by the virtual machine in the first mode of operation is encrypted and written to the first memory component, and the data requested by the virtual machine in the second mode of operation is cleared from any processor registers and buffers in which it is stored.

3. The computer system of claim 2, wherein:
responsive to the ultravisor receiving a system call intended for the hypervisor while the data processing unit is operating in the second mode of operation, process the system call by the ultravisor using the second memory component;
responsive to the ultravisor receiving an interrupt intended for the hypervisor while the data processing unit is operating in the second mode of operation, process the interrupt by the ultravisor using the second memory component; and
responsive to the data processing unit operating in the second mode of operation:
restrict the hypervisor from accessing the second memory component;
intercept hypervisor interrupts to the ultravisor;
execute an ultravisor return from interrupt double word (URFID) instruction to enter the hypervisor, wherein the URFID instruction is ultravisor privileged; and
execute an ultravisor system call to enter the hypervisor.

4. The computer system of claim 3, wherein the data processing unit is further operated to execute instruction architecture extensions to:
execute a thread on a processing core with the secure bit set;
determine whether a matching secure bit is included in an effective address to a real address entry of an Effective to Real Address Translation (ERAT) and a Translation Lookaside Buffer (TLB);
responsive to determining that no matching secure bit is included in the effective address to the real address entry of the ERAT and the TLB, translate the effective address to the real address using a table walk that reads a software structure starting with a PTCR pointer to map the effective address to the real address; and
responsive to determining that the matching secure bit is included in the effective address to the real address entry of the ERAT and the TLB, enable access to the effective address to the real address entry for the ERAT and the TLB.

5. The computer system of claim 4, further comprising:
responsive to determining that the secure bit is set to the first value, determine whether a security violation is identified, based on a value of a real address bit;
responsive to identifying the security violation, prevent the effective address to the real address entry from being added to the TLB and the ERAT, and report a Hypervisor Data Storage Interrupt (HDSI) exception or a Hypervisor Instruction Storage Interrupts (HISI) exception, thereby preventing access to the second memory component; and
responsive to not identifying the security violation, add the effective address to the real address entry to the TLB and the ERAT.

6. The computer system of claim 4, wherein the data processing unit is further operated to execute instruction architecture extensions to:
responsive to determining that the secure bit is set to the first value, determine whether the security violation is identified by using a ultravisor managed bit array indexed by a real page number, wherein the bit array indicates whether a real page number is part of the first memory component or second memory component, and wherein a bit of the bit array is fetched as part of the table walk;
responsive to identifying the security violation, prevent the effective address to the real address entry from being added to the TLB and the ERAT, reporting the HDSI exception and the HISI exception, thereby preventing access to the second memory component; and
responsive to not identifying the security violation, add the effective address to the real address entry to the TLB and the ERAT.

7. The computer system of claim 4, wherein the data processing unit is further operated to execute instruction architecture extensions to:
perform an ultravisor real mode address translation based on an ultravisor real mode offset register (URMOR) configured to translate an effective address of the interrupt into a location stored in the second memory component.

8. The computer system of claim 3, wherein the data processing unit is further operated to execute instruction architecture extensions to:
responsive to the ultravisor handling the interrupt, return control to the hypervisor; and
responsive to identifying an attempt by the virtual machine or the hypervisor to access the second memory component, issue the interrupt.

9. A method comprising:
executing, by a data processing unit, at least one virtual machine via operation of a hypervisor and an ultravisor, wherein a first memory component of one or more computer readable storage media is configured for access by the hypervisor and the ultravisor, and wherein a second memory component of the one or more computer readable storage media is configured for access by the ultravisor and not by the hypervisor;
operating, by the data processing unit, in a first mode of operation that executes the virtual machine using the hypervisor, wherein the first memory component is accessible to the virtual machine and the second memory component is not accessible to the virtual machine; and operating, by the data processing unit, in a second mode of operation that executes the virtual machine using the ultravisor, wherein the first memory component and the second memory component are accessible to the virtual machine, thereby executing application code and operating system code using the second memory component without code changes.

10. The method of claim 9, wherein:

executing, by the data processing unit, instruction architecture extensions to add a secure bit to a thread machine state register of the data processing unit, wherein the secure bit is set to a first value to indicate to the data processing unit to operate in the first mode of operation, and wherein the secure bit is set to a second value to indicate to the data processing unit to operate in the second mode of operation;

when the data processing unit operates in the first mode of operation, data written to the one or more computer readable storage media is written to the first memory component;

when the data processing unit operates in the second mode of operation, the one or more computer readable storage media is configured to access data to the first memory component and the second memory component;

when the data processing unit changes from the second mode of operation to the first mode of operation, before operating in the first mode of operation, the data in the second memory component requested by the virtual machine in the first mode of operation is encrypted and written to the first memory component, and the data requested by the virtual machine in the second mode of operation is cleared from any processor registers and buffers in which it is stored.

11. The method of claim 10, further comprising:

responsive to the ultravisor receiving a system call intended for the hypervisor while the data processing unit is operating in the second mode of operation, processing, by the data processing unit, the system call by the ultravisor using the second memory component;

responsive to the ultravisor receiving an interrupt intended for the hypervisor while the data processing unit is operating in the second mode of operation, processing, by the data processing unit, the interrupt by the ultravisor using the second memory component; and responsive to the data processing unit operating in the second mode of operation:

restricting, by the data processing unit, the hypervisor from accessing the second memory component;

intercepting, by the data processing unit, hypervisor interrupts to the ultravisor;

executing, by the data processing unit, an ultravisor return from interrupt double word (URFID) instruction to enter the hypervisor, wherein the URFID instruction is ultravisor privileged; and executing, by the data processing unit, an ultravisor system call to enter the hypervisor.

12. The method of claim 11, further comprising:

executing, by the data processing unit, a thread on a processing core with the secure bit set;

determining, by the data processing unit, whether a matching secure bit is included in an effective address to a real address entry of an Effective to Real Address Translation (ERAT) and a Translation Lookaside Buffer (TLB);

responsive to determining that no matching secure bit is included in the effective address to the real address entry of the ERAT and the TLB, translating, by the data processing unit, the effective address to the real address using a table walk that reads a software structure starting with a PTCR pointer to map the effective address to the real address; and responsive to determining that the matching secure bit is included in the effective address to the real address entry of the ERAT and the TLB, enabling, by the data processing unit, access to the effective address to the real address entry for the ERAT and the TLB.

13. The method of claim 12, further comprising:

responsive to determining that the secure bit is set to the first value, determining, by the data processing unit, whether a security violation is identified, based on a value of a real address bit;

responsive to identifying the security violation, preventing, by the data processing unit, the effective address to the real address entry from being added to the TLB and the ERAT, and report a Hypervisor Data Storage Interrupt (HDSI) exception or a Hypervisor Instruction Storage Interrupts (HISI) exception, thereby preventing access to the second memory component; and responsive to not identifying the security violation, adding, by the data processing unit, the effective address to the real address entry to the TLB and the ERAT.

14. The method of claim 12, further comprising:

responsive to determining that the secure bit is set to the first value, determining, by the data processing unit, whether the security violation is identified by using a ultravisor managed bit array indexed by a real page number, wherein the bit array indicates whether a real page number is part of the first memory component or second memory component, and wherein a bit of the bit array is fetched as part of the table walk;

responsive to identifying the security violation, preventing, by the data processing unit, the effective address to the real address entry from being added to the TLB and the ERAT, reporting the HDSI exception and the HISI exception, thereby preventing access to the second memory component; and responsive to not identifying the security violation, adding, by the data processing unit, the effective address to the real address entry to the TLB and the ERAT.

15. The method of claim 12, further comprising:

performing, by the data processing unit, an ultravisor real mode address translation based on an ultravisor real mode offset register (URMOR) configured to translate an effective address of the interrupt into a location stored in the second memory component.

16. The method of claim 11, further comprising:

responsive to the ultravisor handling the interrupt, return control to the hypervisor; and responsive to identifying an attempt by the virtual machine or the hypervisor to access the second memory component, issue the interrupt.

17. A computer program product comprising:

a data processing unit configured to execute at least one virtual machine via operation of a hypervisor and an ultravisor;

one or more computer readable storage media, wherein a first memory component of the one or more computer readable storage media is configured for access by the hypervisor and the ultravisor, and wherein a second memory component of the one or more computer readable storage media is configured for access by the ultravisor and not by the hypervisor;

program instructions stored on the one or more computer readable storage media for execution by one or more computer processors, including the data processing unit, wherein the data processing unit is further operated to execute instruction architecture extensions comprising:

program instructions including the instruction architecture extensions to operate in a first mode of operation that executes the virtual machine using the hypervisor, wherein the first memory component is accessible to the virtual machine and the second memory component is not accessible to the virtual machine; and program instructions including the instruction architecture extensions to operate in a second mode of operation that executes the virtual machine using the ultravisor, wherein the first memory component and the second memory component are accessible to the virtual machine, thereby executing application code and operating system code using the second memory component without code changes.

18. The computer program product of claim 17, wherein the program instructions stored on the one or more computer readable storage media, including the instruction architecture extensions, further comprise:

program instructions including the instruction architecture extensions to execute instruction architecture extensions to add a secure bit to a thread machine state register of the data processing unit, wherein the secure bit is set to a first value to indicate to the data processing unit to operate in the first mode of operation, and wherein the secure bit is set to a second value to indicate to the data processing unit to operate in the second mode of operation;

when the data processing unit operates in the first mode of operation, data written to the one or more computer readable storage media is written to the first memory component;

when the data processing unit operates in the second mode of operation, the one or more computer readable storage media is configured to access data to the first memory component and the second memory component;

when the data processing unit changes from the second mode of operation to the first mode of operation, before operating in the first mode of operation, the data in the second memory component requested by the virtual machine in the first mode of operation is encrypted and written to the first memory component, and the data requested by the virtual machine in the second mode of operation is cleared from any processor registers and buffers in which it is stored.

19. The computer program product of claim 18, wherein the program instructions stored on the one or more computer readable storage media, including the instruction architecture extensions, further comprise:

program instructions including the instruction architecture extensions to, responsive to the ultravisor receiving a system call intended for the hypervisor while the data processing unit is operating in the second mode of operation, process the system call by the ultravisor using the second memory component;

program instructions including the instruction architecture extensions to, responsive to the ultravisor receiving an interrupt intended for the hypervisor while the data processing unit is operating in the second mode of operation, process the interrupt by the ultravisor using the second memory component; and program instructions including the instruction architecture extensions to, responsive to the data processing unit operating in the second mode of operation:
restrict the hypervisor from accessing the second memory component;
intercept hypervisor interrupts to the ultravisor;
execute an ultravisor return from interrupt double word (URFID) instruction to enter the hypervisor, wherein the URFID instruction is ultravisor privileged; and
execute an ultravisor system call to enter the hypervisor.

20. The computer program product of claim 19, wherein the program instructions stored on the one or more computer readable storage media, including the instruction architecture extensions, further comprise:

program instructions including the instruction architecture extensions to execute a thread on a processing core with the secure bit set;

program instructions including the instruction architecture extensions to determine whether a matching secure bit is included in an effective address to a real address entry of an Effective to Real Address Translation (ERAT) and a Translation Lookaside Buffer (TLB);

program instructions including the instruction architecture extensions to, responsive to determining that no matching secure bit is included in the effective address to the real address entry of the ERAT and the TLB, translate the effective address to the real address using a table walk that reads a software structure starting with a PTCR pointer to map the effective address to the real address; and program instructions including the instruction architecture extensions to, responsive to determining that the matching secure bit is included in the effective address to the real address entry of the ERAT and the TLB, enable access to the effective address to the real address entry for the ERAT and the TLB.

21. The computer program product of claim 20, wherein the program instructions stored on the one or more computer readable storage media, including the instruction architecture extensions further comprise:

program instructions including the instruction architecture extensions to, responsive to determining that the secure bit is not set to the first value, determine whether a security violation is identified, based on a value of a real address bit;

program instructions including the instruction architecture extensions to, responsive to identifying the security violation, prevent the effective address to the real address entry from being added to the TLB and the ERAT, and report a Hypervisor Data Storage Interrupt (HDSI) exception or a Hypervisor Instruction Storage Interrupts (HISI) exception, thereby preventing access to the second memory component; and program instructions including the instruction architecture extensions to, responsive to not identifying the security violation, add the effective address to the real address entry to the TLB and the ERAT.

22. The computer program product of claim 20, wherein the program instructions stored on the one or more computer readable storage media, including the instruction architecture extensions, further comprise:

program instructions including the instruction architecture extensions to, responsive to determining that the secure bit is not set to the first value, determine whether the security violation is identified by using a ultravisor managed bit array indexed by a real page number, wherein the bit array indicates whether a real page number is part of the first memory component or second memory component, and wherein a bit of the bit array is fetched as part of the table walk;

program instructions including the instruction architecture extensions to, responsive to identifying the security violation, prevent the effective address to the real address entry from being added to the TLB and the ERAT, reporting the HDSI exception and the HISI exception, thereby preventing access to the second memory component; and program instructions including the instruction architecture extensions to, responsive to not identifying the security violation, add the effective address to the real address entry to the TLB and the ERAT.

23. The computer program product of claim 20, wherein the program instructions stored on the one or more computer readable storage media, including the instruction architecture extensions, further comprise:

program instructions including the instruction architecture extensions to perform an ultravisor real mode address translation based on an ultravisor real mode offset register (URMOR) configured to translate an effective address of the interrupt into a location stored in the second memory component.

24. The computer program product of claim 19, wherein the program instructions stored on the one or more computer readable storage media, including the instruction architecture extensions, further comprise:

program instructions including the instruction architecture extensions to, responsive to the ultravisor handling the interrupt, return control to the hypervisor; and program instructions including the instruction architecture extensions to, responsive to identifying an attempt by the virtual machine or the hypervisor to access the second memory component, issue the interrupt.

* * * * *